(12) United States Patent
Oh et al.

(10) Patent No.: US 11,798,439 B2
(45) Date of Patent: Oct. 24, 2023

(54) INFORMATION HANDLING SYSTEM MONITOR WITH SELECTIVELY CURVED AND FLAT DISPLAY PANEL

(71) Applicant: Dell Products L.P., Round Rock, TX (US)

(72) Inventors: Guentaek Oh, Singapore (SG); Kyung Eun Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 17/318,609

(22) Filed: May 12, 2021

(65) Prior Publication Data

US 2022/0366816 A1 Nov. 17, 2022

(51) Int. Cl.
*G09F 9/30* (2006.01)
*F03G 7/06* (2006.01)
*G09F 9/33* (2006.01)

(52) U.S. Cl.
CPC ............ *G09F 9/301* (2013.01); *F03G 7/065* (2013.01); *G09F 9/335* (2021.05)

(58) Field of Classification Search
CPC ......... G06F 1/1652; G06F 2203/04102; G09F 9/301; G02F 1/133322; F03G 7/06143; F03G 7/0614; G09G 9/301; G09G 3/03; G09G 3/035; G09G 2380/02
See application file for complete search history.

(56) References Cited

U.S. PATENT DOCUMENTS

| | | | |
|---|---|---|---|
| 9,081,540 B1* | 7/2015 | Cho | G06F 1/1601 |
| 9,113,553 B2 | 8/2015 | An et al. | |
| 9,576,510 B2 | 2/2017 | Ren et al. | |
| 9,658,646 B2* | 5/2017 | Song | G09F 9/30 |
| 9,746,701 B2 | 8/2017 | Sung et al. | |
| 9,934,708 B2* | 4/2018 | Sun | G09F 9/301 |
| 10,222,638 B2 | 3/2019 | Kim et al. | |
| 10,229,618 B2* | 3/2019 | Chen | G09F 15/0031 |
| 10,772,224 B2* | 9/2020 | Lan | G06F 1/1616 |
| 11,163,335 B1* | 11/2021 | Tzeng | G06F 1/1652 |
| 2013/0329422 A1* | 12/2013 | Park | F21V 23/0471 362/233 |
| 2014/0118910 A1* | 5/2014 | Sung | G02F 1/133305 361/679.01 |
| 2015/0029166 A1* | 1/2015 | Park | G06F 1/1641 345/184 |
| 2015/0119112 A1* | 4/2015 | Hwang | H04M 1/0268 455/566 |

(Continued)

*Primary Examiner* — Joe H Cheng
(74) *Attorney, Agent, or Firm* — ZAGORIN CAVE LLP; Robert W. Holland (57) ABSTRACT

An information handling system display monitor transitions between flat and curved configurations by actuation of a shaped memory alloy wire within the display monitor housing. For example, a nickel titanium wire is heated by application of current across the wire to transition its crystalline form, thereby shortening the wire to adjust the configuration of a foldable display film, such as an OLED display film. Separate shaped memory alloy wires may be used to achieve foldable display film movement in each direction, or actuation of a shaped memory alloy wire in one direction may generate bias in a spring in the opposite direction that is released when a change in foldable display film configuration is desired.

6 Claims, 5 Drawing Sheets

(56) References Cited

U.S. PATENT DOCUMENTS

2016/0305633 A1* 10/2016 Hwang ............... G09F 15/0006
2017/0315401 A1* 11/2017 Im ........................... G09F 9/301
2019/0129474 A1* 5/2019 Chen ....................... G09F 9/301
2021/0026416 A1* 1/2021 Magi ..................... G06F 1/1601
2022/0242328 A1* 8/2022 Pinkelman ................ B60R 7/02

* cited by examiner

INFORMATION HANDLING SYSTEM MONITOR WITH SELECTIVELY CURVED AND FLAT DISPLAY PANEL

BACKGROUND OF THE INVENTION

Field of the Invention

The present invention relates in general to the field of information handling system display monitors, and more particularly to an information handling system monitor with a selectively curved and flat display panel.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally process information with processing components disposed in a housing. For example, a central processing unit (CPU) executes instructions to process information with the instructions and information stored in a random access memory (RAM). A graphics processing unit (GPU) further processes the information to define a visual image with pixel values that define colors for pixels to present at a display. Desktop information handling system typically interface with a peripheral display through a cable to present visual images, such as an HDMI or DISPLAYPORT cable. Portable information handling systems typically integrate a display in the housing to present the visual images for the convenience of mobile end users. Portable information handling systems often include display ports so that the end user can present visual images at a peripheral display.

Peripheral displays come in many sizes and configurations. Some peripheral displays include a liquid crystal display (LCD) panel that presents visual images with a backlight illuminating through liquid crystal pixels that filter red, green and blue light to generate pixel color. Other peripheral displays include an organic light emitting diode (OLED) display panel that creates visual images with current applied to red, green and blue organic material at each pixel to generate pixel color. Both LCD and OLED display monitors provide high quality visual images in peripheral display monitors and when integrated in a portable information handling systems. In addition, both LCD and OLED display monitors may come in flat and curved configurations. A flat display panel configuration disposes all display pixels in a common plane. A curved display panel configuration disposes the display pixels along a curve or semicircle that provides a more direct viewing angle for an end user viewing the display. Curved displays can provide a better viewing experience with a more perpendicular viewing across the width of the display where an end user views from a position central to the arc of the curve. A more normal or perpendicular viewing angle tends to provide the best color appearance for the pixels. However, in situations where multiple users are viewing a display or where an end user's viewing angle can shift when viewing a display, a curved display monitor can detract from the end user experience by presenting visual images with faded colors based on the end user's viewing angle. In such situations a flat display monitor may be preferred.

Figure 1:
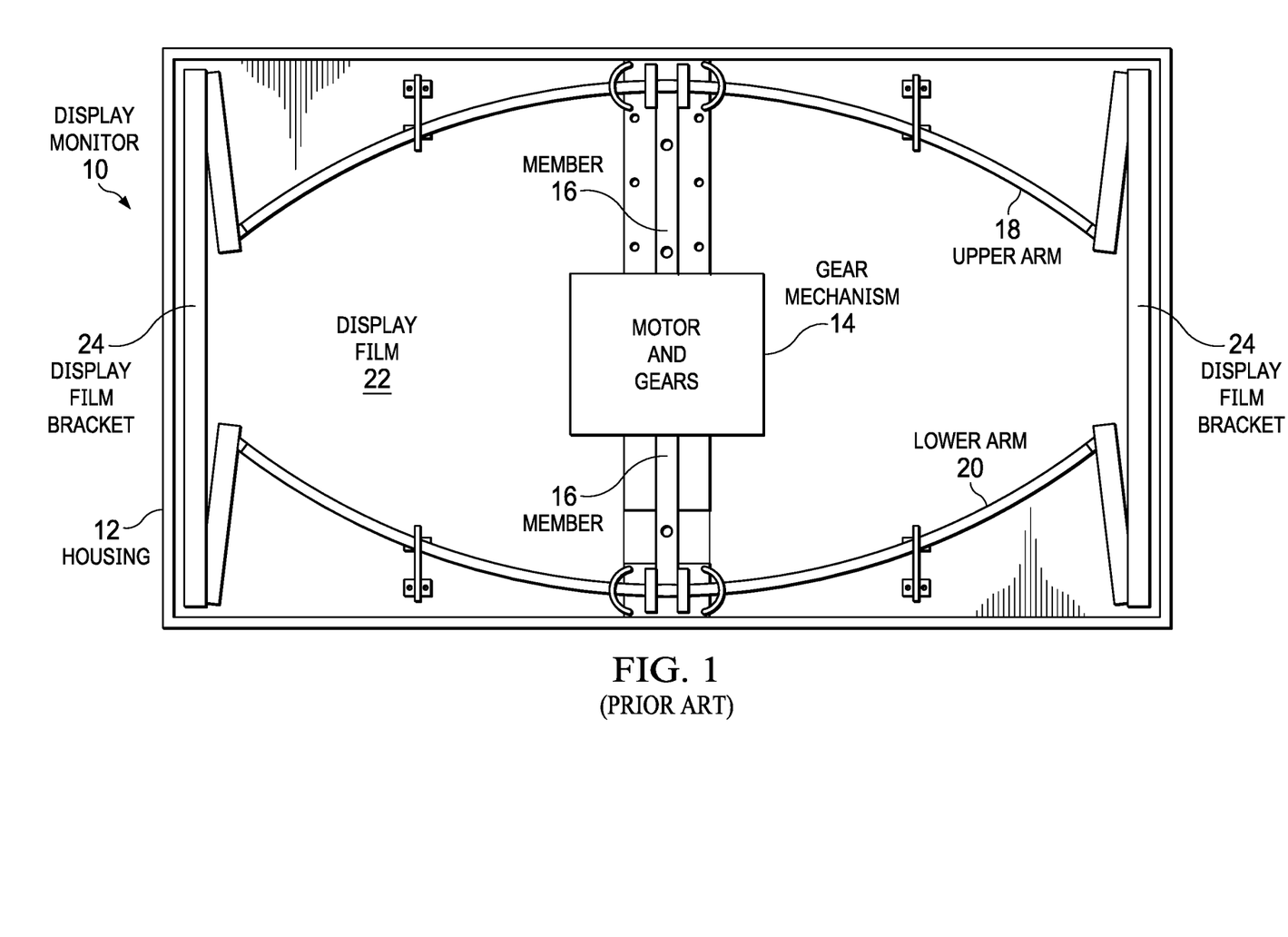
FIG. 1 depicts a rear view of a display monitor having a geared mechanism that translates a foldable display film between flat and covered configurations.

One solution is to manage display configuration by adjusting between curved and flat displays. In particular, OLED display films with a plastic substrate (POLED) are foldable so that a display monitor can shift between a flat and a curved configuration. FIG. 1 depicts one example of a display monitor 10 in a housing 12 having a gear mechanism 14 to achieve a transition between flat and curved configurations. In the example, a motor generates vertical motion of sliding members 16 through gear mechanism 14. The sliding members 16 translate the vertical motion along a vertical axis to horizontal motion along a horizontal axis by upper arm 18 and lower arm 20, which in turn move the foldable display film 22 at display film brackets 24 between flat and curved configurations. A difficulty with this approach is that a peripheral monitor housing and/or portable information handling system housing tends to become oversized when it includes a mechanism for converting the display panel between flat and curved configurations. In addition, as the display panel folds and unfolds, other types of housing devices can be disrupted, such as exterior illumination, or in the case of a foldable LCD panel, back light illumination.

SUMMARY OF THE INVENTION

Therefore, a need has arisen for a system and method which provides a selectively curved and flat display panel.

In accordance with the present invention, a system and method are provided which substantially reduce the disadvantages and problems associated with previous methods and systems for adjusting a display panel between curved and flat configurations. A shaped memory alloy wire is heated to transition from a first to a second length, and the change in wire length is translated to movement of a foldable display film between flat and curved configurations.

More specifically, a display monitor generates visual images at a foldable of an LCD or OLED display film. The display monitor couples the foldable display film to a housing, such as a peripheral display monitor housing or portable information handling system housing, that integrates a shaped memory alloy actuator operable to move the foldable display film between flat and curved configurations. In one example embodiment, first and second shaped memory alloy wires disposed along a central vertical axis translate force to horizontal arms that fold and flatten the foldable display film. In another example embodiment, shaped memory alloy wire provides movement of the foldable display film in one direction and builds tension in a biasing device, such as a spring, that is released to move the foldable display film in the opposite direction. A latch couples the foldable display film in each configuration and releases to apply the biasing device tension to return the foldable display film to the pre-actuation configuration.

The present invention provides a number of important technical advantages. One example of an important technical advantage is that a transition in shaped memory alloy wire length in response to heat is applied to move a display film between flat and curved configurations. The shaped memory alloy wire actuator consumes minimal footprint and power to actuate changes in display film configuration, thereby reducing the display monitor footprint. The availability of flat and curved configurations optimizes an end user viewing experience for different situations, such as gaming versus word processing or single-viewer use versus multiple viewer use. Fiber optic cables coupled to the display monitor provide visual light, such as for exterior aesthetic effects or as a backlight of a foldable display film, and bend to conform to flat and curved display film configurations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display monitor converts between flat and curved configurations with a shaped memory alloy actuator. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2A:
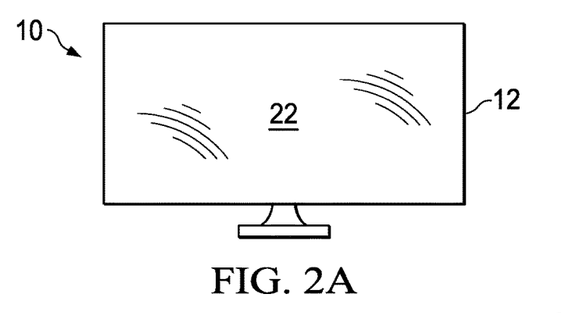
FIGS. 2A and 2B depict flat and curved configurations of a foldable display film.
Figure 2B:
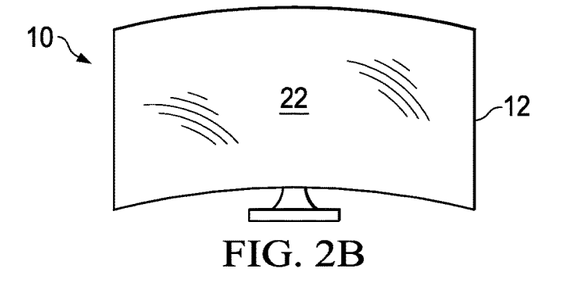

Referring now to FIGS. 2A and 2B, flat and curved configurations of a foldable display film are depicted. FIG. 2A depicts a flat configuration having the foldable display film 22 coupled to a housing 12 with a flat configuration having the pixels disposed in a common plane. A flat configuration provides a planar viewing surface with optimal viewing of pixels at an axis normal to the plane so that an end user can move relative to the display monitor 10 to view visual images that are presented. A normal viewing axis across the plane of the display monitor may be preferred for some gaming content and work applications, such as word processing. In addition, a normal viewing axis permits multiple users to view content simultaneously without an optimized central viewing position. FIG. 2B depicts a curved configuration having the foldable display film 22 coupled to housing 12 with a curved configuration having pixels disposed in an arc defined at a radius center point of the end user's viewing position. The curved configuration provides a rounded viewing surface with optimal normal viewing of the pixels at the center point of the curve for visual images presented at the display monitor 10. Viewing visual images from a center point offers an optimal viewing configuration for a single end user viewing high quality images, such as gaming applications or audiovisual content. The flat and curved configurations are selected by actuation of an actuator in housing 12 that selectively folds and unfolds the foldable display film, as described in greater detail in the example embodiments below. Foldable display film 22 may be a POLED display film or an LED display panel integrated with a foldable backlight. The example embodiment depicts a peripheral display monitor that interfaces as a separate peripheral device to an information handling system, such as with a display cable. In an alternative embodiment, display monitor 10 may integrate in a portable information handling system housing. The example embodiment depicts that housing 12 moves with the opposing edges of foldable display film 22, however, an alternative embodiment may have a fixed housing having the foldable display film moving to the curved configuration by separating from the housing edges to fold into the housing interior or partially out the housing front.

Figure 3:
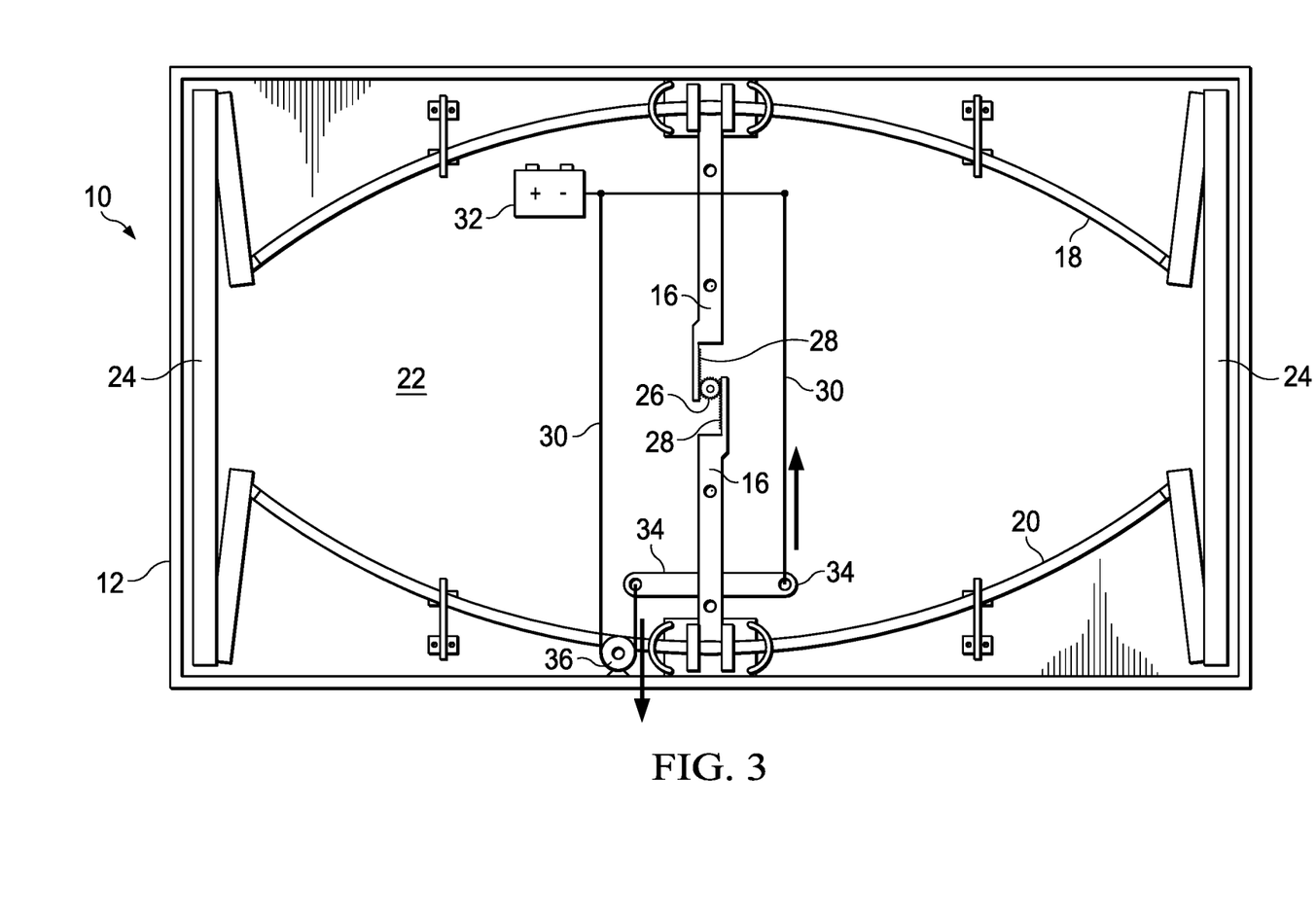
FIG. 3 depicts an example embodiment of an actuator that provides actuation of a shaped memory alloy wire along a horizontal axis to move a folded display film between flat and curved configurations.

Referring now to FIG. 3, an example embodiment depicts an actuator that provides actuation of a shaped memory alloy wire 30 along a horizontal axis to move a folded display film 22 between flat and curved configurations. Shaped memory alloy wire 30 is, for example, a nickel titanium alloy that transitions between crystalline states based upon temperature to provide first and second lengths. In a martensitic crystalline form of a cooled state, the shaped memory alloy may be deformed, known as twinning. In an austenite crystalline form of a heated state, the shaped memory alloy returns to a pre-deformed shape. One effect, known as "muscle wire," is a rapid shortening of the shaped memory alloy wire when heated that is used to actuate the foldable display film shape. In the example embodiment, a first shaped memory alloy wire 30 couples from the top of housing 12 to a connector 34 on the lower sliding member 16. A second shaped memory alloy wire 30 routes from the top of housing 12 to couple to the lower sliding member 16 at a second connector 34. A current source 32 interfaces with both shaped memory alloy wires 30 to selectively apply current that heats the wires individually. At actuation of the first shaped memory allow wire 30, lower sliding member 16 is pulled upwards to engage teeth 28 at gear wheel 26 and transfers sliding motion to the upper sliding member 16 in a downward direction. At actuation of the second shaped memory alloy wire 30, the lower sliding member 16 is pulled downward, which movement is translated through teeth 28 and gear wheel 26 to raise upper sliding member 16. The motion of sliding members 16 is translated through lower arm 16 and upper arm 18 to move display film brackets 24 between the flat and curved configurations. Gear wheel 26 includes a friction device, such as a friction washer, that regulates the speed of foldable display film 22 motion and prevents movement of sliding member 16 except in response to actuation of one of the shaped memory alloy wires 30. To obtain the same amount of movement from each shaped memory alloy wire 30, the same length of wire is used for both directions of travel. Actuation is performed by a temporary heating of the wire to change crystalline form and then current is turned off.

Figures 4A, 4B:
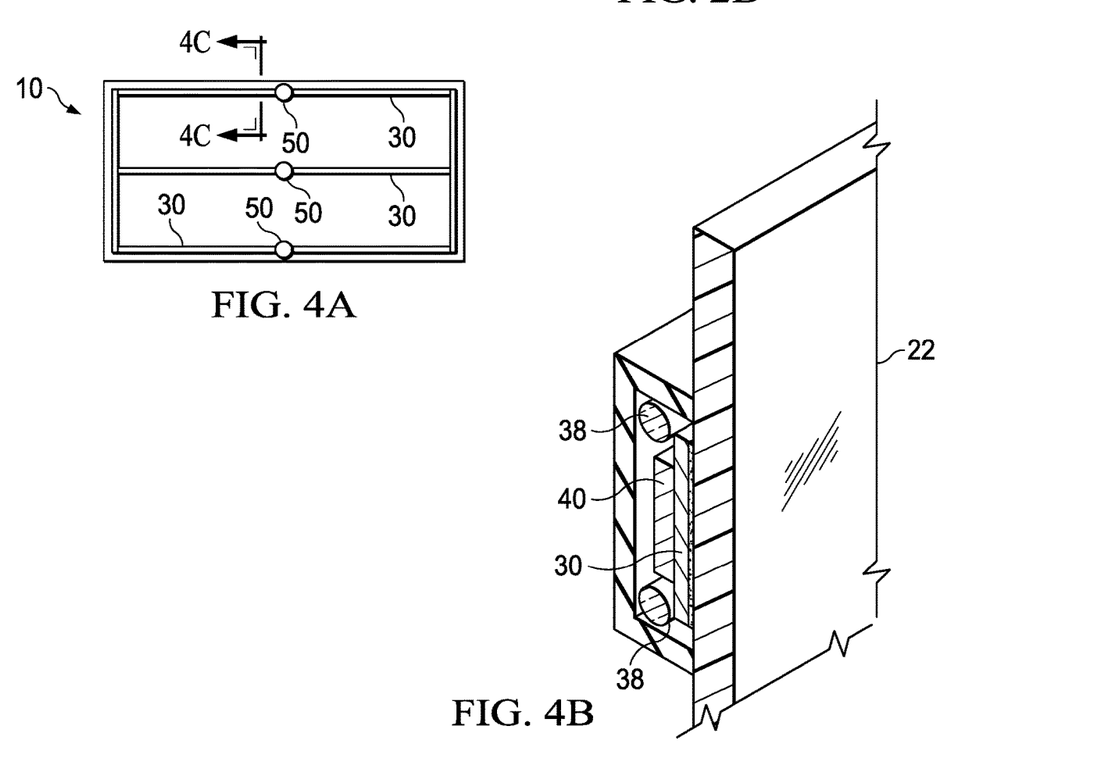
FIGS. 4A, 4B, 4C, 4D and 4E depict an example embodiment of an actuator that moves a foldable display film to a curved configuration by actuation of a shaped memory alloy wire.
Figure 4C:
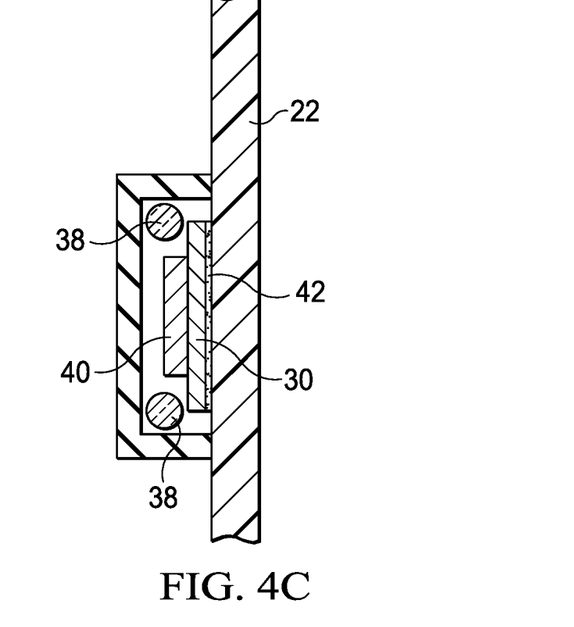

Referring now to FIGS. 4A, 4B, 4C, 4D and 4E, an example embodiment depicts an actuator that moves a foldable display film 22 to a curved configuration by actuation of a shaped memory alloy wire 30. In the example embodiment, a rear view of display monitor 10 shows three separate shaped memory alloy wires 30 disposed across the width of housing 12 at a top, middle and bottom location. Each shaped memory alloy wire couples to a central location 50 of foldable display film 22 and, in a cooled state with a greater length, bends at the center location with foldable display film 22 in a flat configuration. When the shaped memory alloy wires 30 are heated, the wires shorten and straighten to pull backwards at foldable display film 22 so the center portion curves rearward. Once in the curved configuration, a latch engages foldable display film 22 to hold it in the curved configuration and heat is removed, resulting in a bias of the shaped memory alloy wires 30 to bend forward towards the flat configuration. Release of the latch returns the display monitor to the flat configuration. FIG. 4B depicts a sectional view of one of the shaped memory alloy wires 30 assemblies coupled to the rear of the foldable display film. In the example embodiment, a hot wire 40 couples to the shape memory alloy wire 30 to provide heat for crystalline phase change without running current through the shaped memory alloy wire. An optical fiber 38 couples above and below the shaped memory alloy wire 30 to provide light effects at the rear of foldable display 22. The optical fiber 38 provides illumination along its length and bends to conform to the curved and flat configurations at the display monitor rear. In an embodiment having an LCD foldable display film, one or more optical fibers 38 may provide backlight illumination. FIG. 4C illustrates an example embodiment where a double sided adhesive tape 42 couples shaped memory alloy wire 40 to the rear side of foldable display film 22.

Figure 4D:
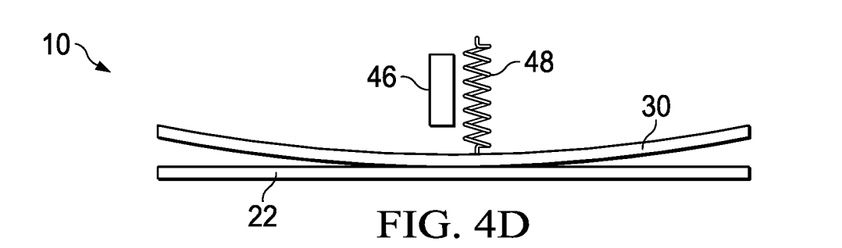
Figure 4E:
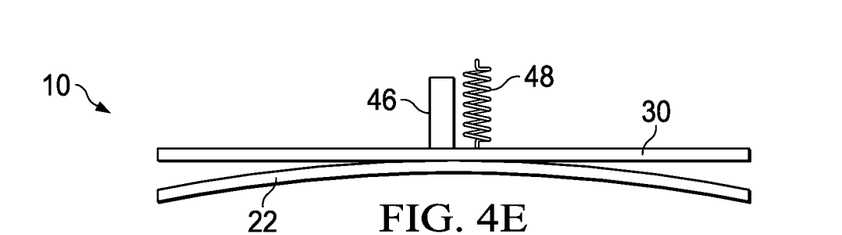

FIGS. 4D and 4E illustrate the relationship of shaped memory alloy wire 30 and foldable display film 22 in flat and curved orientations. In FIG. 4D, shaped memory alloy wire 30 is in a cool state having an increased length. The length is greater than the width of foldable display film 22 resulting in some arc of shaped memory alloy wire 30 that biases foldable display film 22 to the flat configuration. When heat is applied to shaped memory alloy wire 30, a "muscle wire" effect causes the shaped memory alloy wire 30 to shorten so that the wire is pulled straight as illustrated in FIG. 4E. When shaped memory alloy wire 30 straightens, foldable display 22 is pulled to the curved configuration as illustrated and held in place by a latch 46 once heat is removed from the wire and it returns to the original length. A spring 48 or other biasing device builds tension through compression so that as latch 46 releases spring 48 biases foldable display film 22 to the flat configuration.

Figure 5:
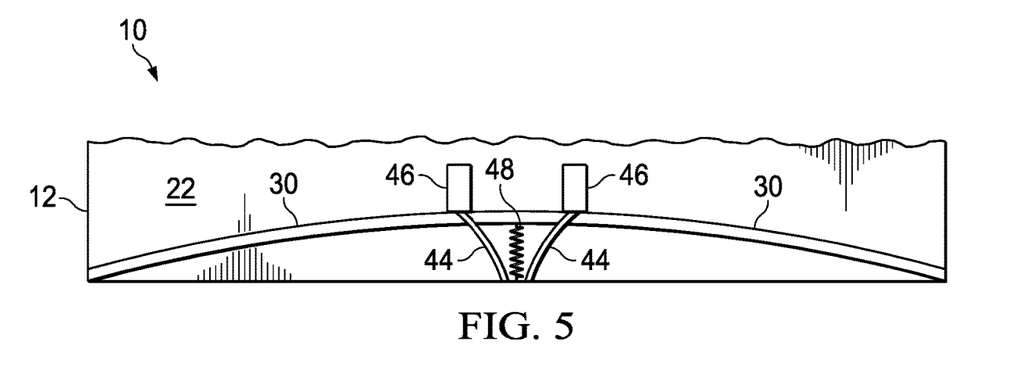
FIG. 5 depicts an alternative embodiment of an actuator that provides actuation of a shaped memory alloy wire along a horizontal axis to move a folded display film to a flat configuration from a curved configuration.

Referring now to FIG. 5, an alternative embodiment depicts an actuator that provides actuation of a shaped memory alloy wire 30 along a horizontal axis to move a folded display film to a flat configuration from a curved configuration. In the example embodiment, a front view of the bottom side of display monitor 10 is shown with bezel removed. When heat is applied to shaped memory wire 30, the wire shortens and pulls foldable display film 22 to a flat configuration along guides 44. The movement to the flat configuration compresses a spring 48, which provides a bias to return to the curved configuration. A latch 46 couples foldable display film 22 to housing 12 while shaped memory alloy 30 is in the short state from heat, and then hold foldable display film 22 in the flat configuration after shaped memory alloy wire 30 cools.

Figure 6:
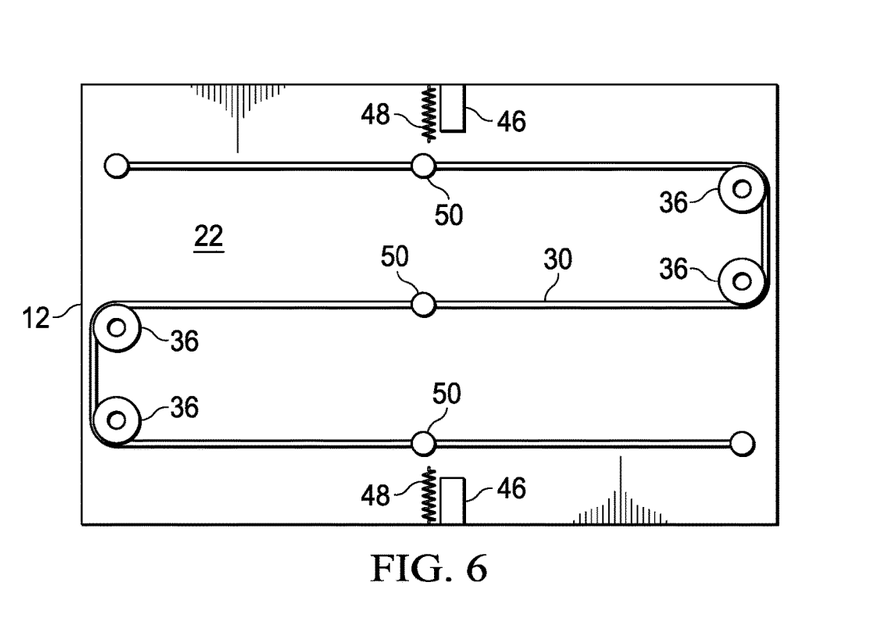
FIG. 6 depicts an alternative embodiment of an actuator that provides actuation of a shaped memory alloy wire along a horizontal axis to move a folded display film to a flat configuration from a curved configuration.

Referring now to FIG. 6, an alternative embodiment depicts an actuator that provides actuation of a shaped memory alloy wire 30 along a horizontal axis to move a folded display film 22 to a flat configuration from a curved configuration. The example embodiment works in a similar manner to that of FIGS. 4A-4E by heating shaped memory alloy wire 30 to pull foldable display film 22 to a curved configuration, and holding the curved configuration with latch 46, then releasing bias of a spring 48 to return to the flat configuration. In the example of FIG. 6, a single and longer length of shaped memory alloy wire 30 is looped in different directions around the back of housing 12 at pulleys 36 to generate force to actuate foldable display film 22. The length of shaped memory wire 30 impacts the amount of movement generated by the muscle wire effect when heat is applied, where a longer wire produces greater movement. In display monitors of different sizes and having different curved configurations, the length of wire may be adjusted to generate a desired amount of movement.

Although the present invention has been described in detail, it should be understood that various changes, substitutions and alterations can be made hereto without departing from the spirit and scope of the invention as defined by the appended claims.

What is claimed is:

1. A display monitor comprising:
   a housing having a front face;
   a foldable display disposed in the front face and foldable between a flat configuration and a curved configuration;
   a shaped memory alloy actuator interfaced with the foldable display and operable in response to heat applied to a shaped memory alloy wire to actuate the foldable display between the flat and curved configurations; and
   a current source interfaced with the shaped memory alloy wire, the current source operable apply a current to selectively heat the shaped memory alloy wire to actuate the foldable display;
   wherein:
   the shape memory alloy wire has first length when below a predetermined temperature and a second length when above the predetermined temperature, the first length greater than the second length;
   the shape memory alloy wire couples at a central region of the foldable display to bias the foldable display to the curved configuration; and the shape memory alloy wire transitions from the first length to the second length in response to heat, the second length applying a force to transition the foldable display from the curved configuration to the flat configuration.

2. The display monitor of claim 1 further comprising a latch interfaced with the foldable display in the flat configuration to hold the foldable display in the flat configuration when the shape memory alloy wire has the first length and to release the foldable display from the flat configuration to the curved configuration when the shape metal alloy wire has the first length.

3. The display monitor of claim 2 wherein the shape memory alloy wire winds across the display monitor width plural times.

4. The display monitor of claim 1 further comprising an optical fiber coupled to the housing and configured to bend in the curved configuration.

5. A display monitor comprising:
- a housing having a front face;
- a foldable display disposed in the front face and foldable between a flat configuration and a curved configuration;
- a shaped memory alloy actuator interfaced with the foldable display and operable in response to heat applied to a shaped memory alloy wire to actuate the foldable display between the flat and curved configurations; and
- a current source interfaced with the shaped memory alloy wire, the current source operable apply a current to selectively heat the shaped memory alloy wire to actuate the foldable display;

wherein:
the shape memory alloy wire has first length when below a predetermined temperature and a second length when above the predetermined temperature, the first length greater than the second length;
the shape memory alloy wire couples at opposing sides of the housing; and
the shape memory alloy wire transitions from the first length to the second length to pull opposing sides of the foldable display towards the housing center and transition the foldable display to the curved configuration.

6. A display monitor comprising:
- a housing having a front face;
- a foldable display disposed in the front face and foldable between a flat configuration and a curved configuration;
- a shaped memory alloy actuator interfaced with the foldable display and operable in response to heat applied to a shaped memory alloy wire to actuate the foldable display between the flat and curved configurations; and
- a current source interfaced with the shaped memory alloy wire, the current source operable apply a current to selectively heat the shaped memory alloy wire to actuate the foldable display;
- an upper arm and a lower arm, each of the upper and lower arms coupling to first and second brackets at opposing sides of the housing;
- a first shaped memory alloy wire coupled between the upper and lower arms to draw the upper and lower arms towards each other and the foldable display to a flat configuration in response to heat applied to the first shaped memory alloy wire; and
- a second shaped memory alloy wire coupled between the upper and lower arms to draw the upper and lower arms apart from each other and the foldable display to a curved configuration in response to heat applied to the second shaped memory alloy wire.

* * * * *

UNITED STATES PATENT AND TRADEMARK OFFICE
CERTIFICATE OF CORRECTION

| | | |
|---|---|---|
| PATENT NO. | : 11,798,439 B2 | Page 1 of 1 |
| APPLICATION NO. | : 17/318609 | |
| DATED | : October 24, 2023 | |
| INVENTOR(S) | : Guentaek Oh and Kyung Eun Lee | |

It is certified that error appears in the above-identified patent and that said Letters Patent is hereby corrected as shown below:

In the Claims

In Column 7, Line 11, Claim 2 please replace "metal" with --memory--.

Signed and Sealed this
Twelfth Day of December, 2023

Katherine Kelly Vidal
*Director of the United States Patent and Trademark Office*